United States Patent
Johnson

[15] 3,663,036
[45] May 16, 1972

[54] VEHICLE SAFETY DEVICE HAVING AN INFLATABLE CONFINEMENT

[72] Inventor: James T. Johnson, Herrin, Ill.
[73] Assignee: Olin Corporation
[22] Filed: June 16, 1970
[21] Appl. No.: 46,612

[52] U.S. Cl............................................280/150 AB, 222/5
[51] Int. Cl.......................................................B60r 21/10
[58] Field of Search...............141/10, 67, 68, 313, 4; 222/3,
222/5; 9/313-318; 23/281; 102/39; 280/150

[56] References Cited

UNITED STATES PATENTS

| | | |
|---|---|---|
| 3,117,424 | 1/1964 | Hebenstreit................................222/3 |
| 3,180,373 | 4/1965 | Hebenstreit...........................23/281 X |
| 1,933,694 | 11/1933 | Allen et al. ...............................102/39 |
| 3,197,234 | 7/1965 | Bertrand...........................280/150 AB |
| 3,269,310 | 8/1966 | Wismar.........................................9/321 |
| 3,450,414 | 6/1969 | Kobori...............................280/150 AB |

*Primary Examiner*—Kenneth H. Betts
*Attorney*—Donald R. Motsko, H. Samuel Kieser and William W. Jones

[57] ABSTRACT

An apparatus for use in a safety system utilizing an inflatable confinement means, stored fluid under pressure, and a propellant charge for the generation of a hot gas. Means are provided for storing fluid under pressure which has a fluid outlet. A propellant chamber is provided for receiving an ignitable hot-gas generating charge of propellant. Means are provided to seal said chamber from said stored fluid. The arrangement is such that upon development of a predetermined chamber pressure after ignition of propellant, the chamber is unsealed and the fluid outlet is opened to permit the stored fluid and hot gas from the burning of the propellant to exit through the outlet. Means are provided between the chamber and the fluid outlet to deflect the hot gas upon exit from the chamber in a direction away from the fluid outlet to mix with the fluid prior to exit.

16 Claims, 7 Drawing Figures

INVENTOR:
JAMES T. JOHNSON

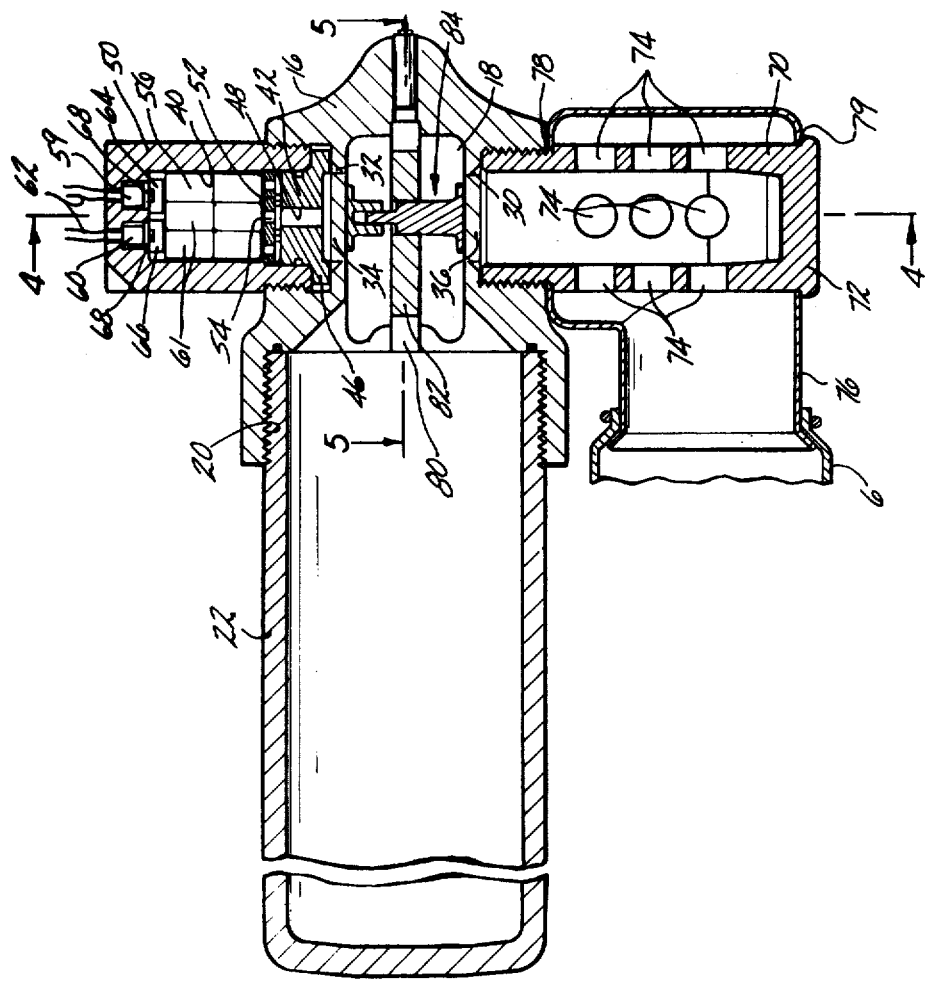

INVENTOR:
JAMES T. JOHNSON

BY H. Samuel Kieser
ATTORNEY

3,663,036

VEHICLE SAFETY DEVICE HAVING AN INFLATABLE CONFINEMENT

This invention relates generally to the field of inflatable safety devices, and more particularly to an improved inflating system for use with an inflatable bag.

A great deal of attention has been given recently to the problem of increasing the safety of passenger vehicles. As well as trying to increase the inherent safety of the vehicle itself, considerable effort has been directed to the development of safety devices which will be automatically responsive to the impact of a vehicle due to an accident to energize a system which will protect the occupants from injury due to that impact. One system of this type utilizes an inflatable containment means such as a bag which is automatically inflated in response to a predetermined condition of the vehicle such as impact or upset, to prevent the occupant from contacting the interior thereof.

In systems utilizing inflatable confinements, several factors are of importance. The time in which the bag must be inflated is very critical. From the time the predetermined condition is sensed by a suitable sensor to the time that the bag must be inflated is measured in terms of milliseconds. Thus it is important to devise a system in which the inflatable confinement can be inflated as rapidly as possible. Another important consideration in systems of this type is size. As it is likely that a plurality of bags and inflating systems therefor will be used it is desirable that the inflating system be as small as possible so as to require relatively little space in the vehicle for storage.

Accordingly, one of the objects of this invention is to provide an improved inflating system adapted to inflate an inflatable confinement.

More specifically, an object of the present invention is the provision of an improved inflating system of the type which supplies additional energy to a stored fluid.

A further object of the present invention is to provide an inflating system which is relatively small in size.

These and other objects and advantages of the present invention will be more readily appreciated by reference to the following description and to the accompanying drawings in which:

FIG. 3 is a cross-sectional view of one of the embodiments of the present invention;

FIG. 4 is an enlarged transverse view taken along the lines 4—4 of FIG. 3;

Figure 1:
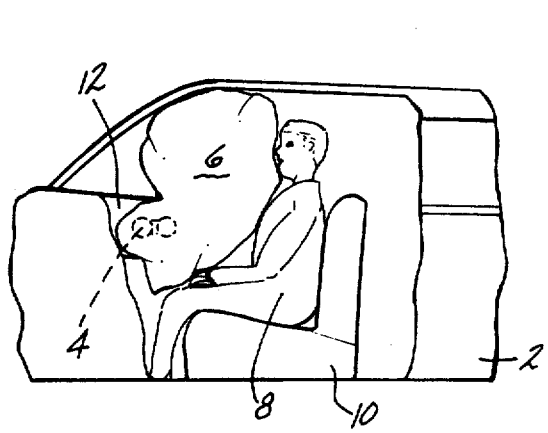
FIG. 1 is a partially broken away, fragmentary, side view of a vehicle equipped with a device constructed in accordance with the present invention and showing the inflatable confinement in an inflated condition.

Referring to the drawings and particularly to FIG. 1, a vehicle 2 is shown provided with a safety assembly comprising generally an inflating system 4 and an inflatable confinement such as a bag 6. An occupant 8 is shown seated in the front seat 10 of the vehicle 2. The safety assembly may be mounted in the dashboard 12 of the vehicle 2 with the bag 6 normally stored in the collapsed condition. In the event of impact of the vehicle due to a crash, the inflating system 4 will be actuated to inflate the bag 6 as shown in FIG. 1 and prevent the occupant 8 from coming into contact with the interior of the vehicle. It is to be understood that the safety device designed according to the present invention can be placed in other locations. For example, the device may be placed on the inside of the roof of the vehicle, or in the back of the seat whereby whiplash injury will be prevented upon actuation, or in the steering wheel column.

The inflating system 4 includes generally a pressure source 14 which is connected to the inflatable confinement 6 which is normally stored in a collapsed condition. The pressure source 14 in accordance with the embodiment shown in FIGS. 3–6, includes a housing 16 having a chamber 18 therein. The housing 16 is provided with a threaded inlet 20 to which is attached a tank 22, the interior of which together with the chamber 18 provides a reservoir for storing fluid such as air under pressure. A shoulder 21 in the inlet 20 is provided with a groove 23 in which is mounted O-ring 25 to provide a seal between the housing 16 and tank 22.

The housing 16 also includes a fluid outlet 26 which is spaced across the chamber from and in alignment with a threaded propellant inlet 28. The wall of the chamber 18 normally closes the outlet 26 and propellant inlet 28. However, the walls of the chamber 18 are provided with circular grooves 30 and 32 to provide rupturable closure portions 36 and 34.

A chamber 40 for storing propellant and an igniter is attached to the propellant inlet 28. The chamber 40 includes a nozzle member 42 having a flange 46 in engagement with the wall of the chamber 18 closing the inlet 28. A single orifice 48 extends through the nozzle member 42. A hollow, cylindrical member 50 having its outer end closed is threadedly attached to the inlet 28 and clamps the nozzle member 42 between the forward face of member 50 and the inlet closure portion 34. A plate member 52 having a series of perforations 54 therein is mounted within the member 50 between the nozzle member 42 and a suitable propellant 56. The plate member 52 rests on a raised rim 57 and projections 58 on the end of nozzle member 42 whereby a space is provided between the two members.

The propellant 56 may be of any suitable type capable of generating a hot preferably non-toxic gas when ignited. Nitrocellulose based smokeless powder with or without various modifiers may be used. The propellant may be in the form of loose powder, a solid gas generating cartridge, or a plurality of large grains.

According to the present embodiment, two squibs 59 and 60 are mounted in the outer end of member 50 with their lead wires 62 protruding therefrom. Positioned within the cylindrical member 50 and immediately adjacent the squibs 59 and 60 may be igniter pellets 64 and 66. Each of pellets 64 and 66 may have a body fabricated from compact bulk powder with a primer 68 of a suitable high explosive adhered thereto and facing its respective squib 59 or 60.

In the embodiment shown in FIGS. 3–6, the propellant is in the form of a plurality of large grains 61. The grains are prevented from clogging the orifice 48 of the nozzle member 42 by the plate member 52.

A diffuser member 70 is threadedly secured to the outlet 26 of housing member 16. The diffuser member may be of generally cylindrical shape having a closed outer end 72 with the side wall thereof provided with a plurality of apertures 74. A manifold 76 surrounds the side wall of the diffuser member 70 and is held in position by virtue of shoulders 78 and 79 on the diffuser member 70 clamping it thereto. The inflatable confinement 6 is attached to the manifold 76 by any suitable method.

The chamber 18 of the housing 16 includes a groove 80 which extends around the chamber from a point adjacent the threaded inlet 20. The mid-plane of the groove 80 is perpendicular to the axis of the fluid outlet 26 and propellant inlet 28. A baffle member 82 is positioned within the groove and substantially sub-divides the chamber 18 into two separate sections. The baffle member 82 is thus positioned so that it is substantially perpendicular to the common axes of the fluid outlet 26 and propellant inlet 28. The end of the groove 80 may be staked to hold the baffle member 82 in place or a suitable adhesive used for this purpose.

A mechanical linkage 84 is provided between rupturable closure portion 34 and rupturable closure portion 36. The linkage includes a first member 83 having a cylindrical body 84 provided with a flange 86 at one end and a bore 88 extending axially inward from the opposite end. The flanged end of member 83 may be attached to the rupturable closure portion 34 by means of an epoxy adhesive or any other suitable means. A second member 90 includes a cylindrical body 92 and a flanged end 94 which is attached to rupturable portion 36 in a manner similar to that described in connection with member 83. The body 92 extends through an aperture 96 in the baffle plate 82 and includes a reduced axially extending projection 98 which extends into the bore 88 of member 83. As will be noted in FIG. 3, the cylindrical body portions 84 and 92 are spaced from each other such that member 83 can move relative to member 90 a predetermined distance before the two members impact together.

With the unit assembled, the reservoir is filled with the desired fluid to the desired pressure through a suitable valve indicated generally by 100 mounted in the housing 16. The baffle member 82 includes a cutout 108 which is deeper than the depth of the groove 80 to provide communication between the valve 100 and chamber 18 when the baffle member is in place.

Any suitable fluid may be used. In the preferred embodiment the fluid is air. It is to be understood that other non-toxic gases could be used.

Figure 2:
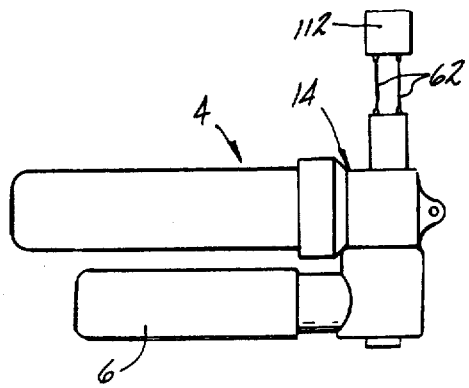
FIG. 2 is a schematic representation of a safety system for a vehicle incorporating the present invention.
Figure 5:
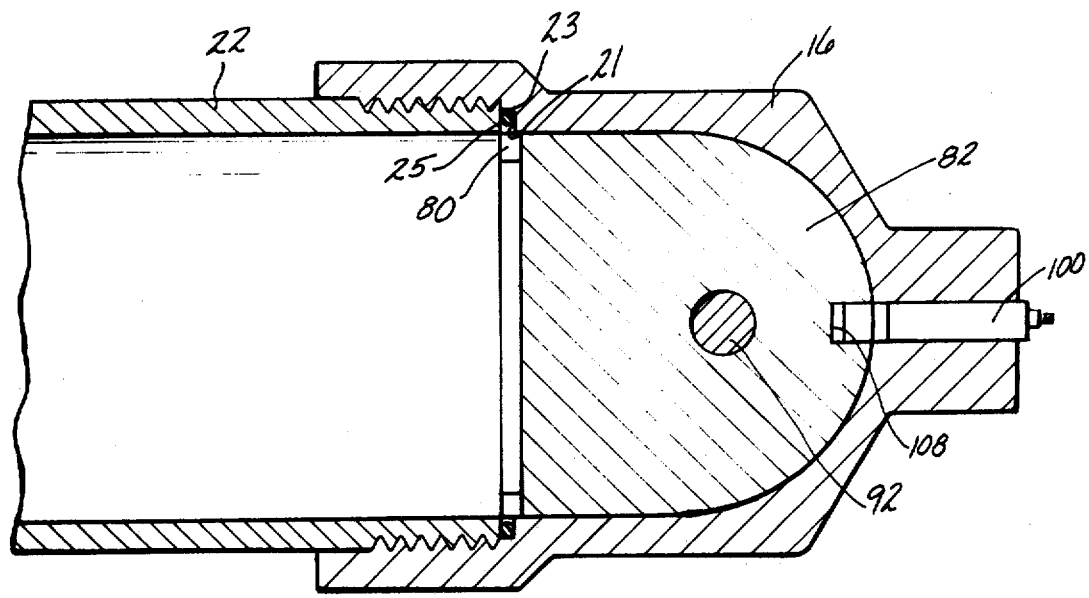
FIG. 5 is an enlarged transverse view taken along the lines 5—5 of FIG. 3.

When the device is installed in a vehicle, the leads 62 from the squibs 59 and 60 are attached to an appropriate sensing device (shown schematically by numeral 112 in FIG. 2) such as an accelerometer or inertia responsive switch designed to sense when the vehicle is involved in an accident. Upon activation of the sensing device, an electrical current is passed through the leads 62 to the squibs 59 and 60 whereby the squibs are initiated to commence the burning of the propellant. The initiation of the squibs 59 and 60 in turn ignite the pellets 64 and 66 which burn and ignite the main propellant charge 56. The propellant charge 56 burns and generates hot gas under pressure which passes through the orifice 48 in nozzle member 42 and acts upon closure portion 34. The nozzle member 42 serves to control the rate of pressure buildup. Upon rupture of closure portion 34 after the pressure has built up to the predetermined level, the member 83 moves across the chamber 18 and impacts against member 92. This impact is transferred to rupturable closure portion 36 and causes the rupture thereof to open the outlet 26. Member 83 will be captured by the baffle plate 82 while member 92 and rupturable portion 36 will be caught in the diffuser member 70.

Figure 6:
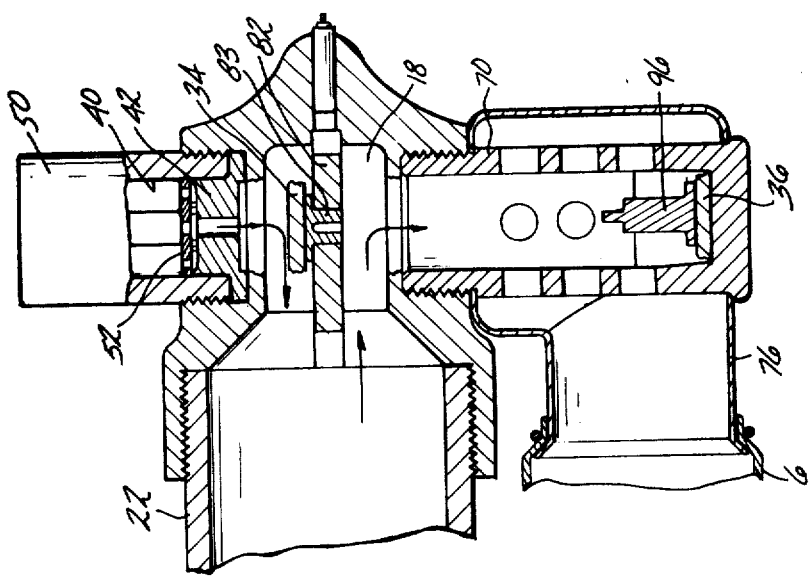
FIG. 6 is a view similar to that of FIG. 3 but showing the components of the device positioned after the system has been actuated.

As indicated by the arrows in FIG. 6, the hot gas will then flow into the chamber 18 and impinge upon the baffle member 82. The baffle member 82 and the end wall of the chamber 18 serve to direct the gas toward and into the tank 24 whereupon they mix with the pressurized fluid therein. The combination of pressurized fluid and hot gas will then flow through the outlet 26, through the apertures 74 in the diffuser member 70 into the manifold 76 which directs the gas and fluid into the bag 6 to cause the inflation thereof. The diffuser member 70 serves to reduce the velocity of the fluid and gas mixture flowing into the bag.

By diverting the hot gases into the main portion of the fluid reservoir, i.e., that formed by tank 22, the decrease in the temperature of the fluid contained in the reservoir due to the expansion as it flows through outlet 26 is offset by the high temperature gas. The increase in the temperature of the stored fluid results in an increase in fluid pressure which tends to offset the reduction in fluid pressure due to its flow out of the reservoir through outlet 26. This assures a more rapid volumetric flow rate into the bag 6. In addition, the higher temperature fluid in the reservoir as the bag filling approaches completion and the pressure in the reservoir is low results in a much lower density gas remaining in the reservoir. This means that a much higher percentage of the air stored in the reservoir has been moved into the bag as a result of heating than would have flowed into it if no heat had been added.

The fact that members 83 and 90 are axially spaced from each other not only simplifies the tolerance problems of assembly, but also means that upon rupture of member 34, member 83 will achieve a velocity before impacting upon member 92 whereby member 36 will be ruptured by the impact rather than by pressure buildup which will be the case if a direct connection were used between the two members.

Figure 7:
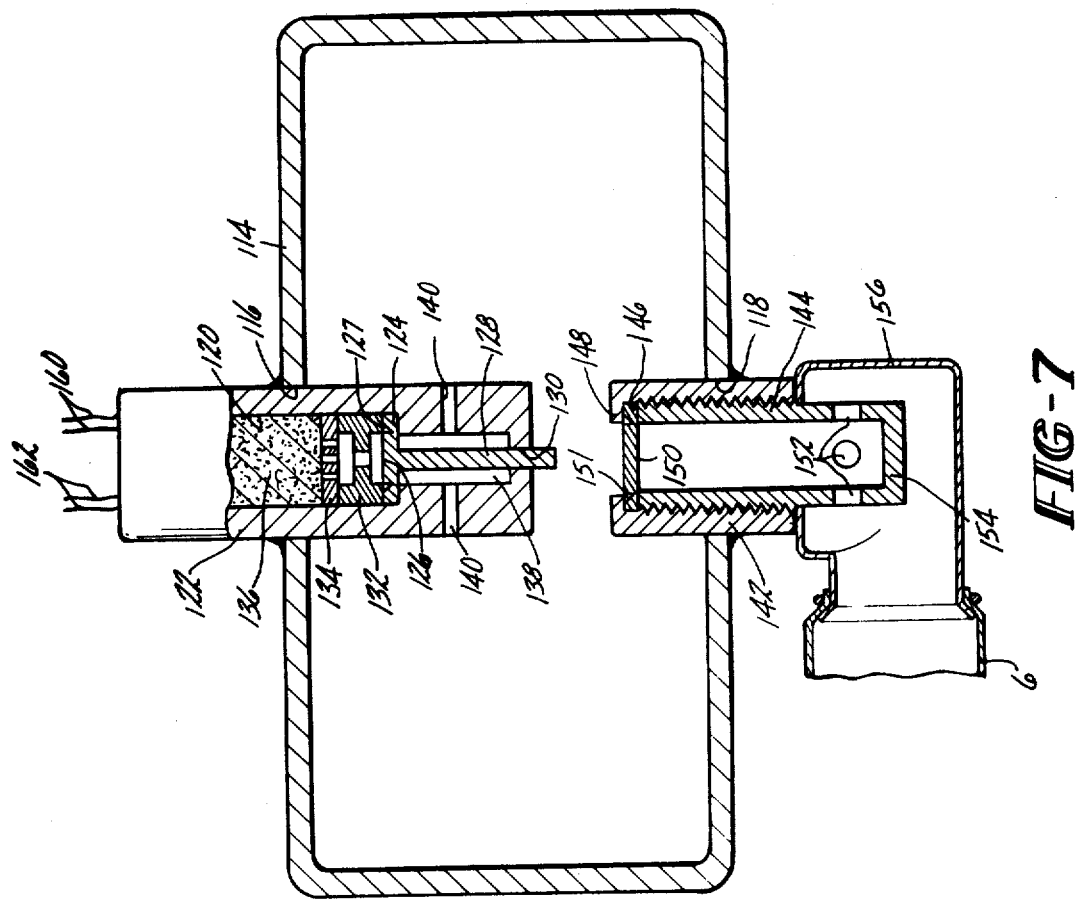
FIG. 7 is a cross-sectional view of a second embodiment of the present invention.

In accordance with the second embodiment shown in FIG. 7, a tank member 114 is provided having a propellant inlet opening 116 and an outlet 118. A propellant chamber 120 is mounted within the propellant inlet opening 116 and includes a generally cylindrical housing member 122 which may be welded or otherwise attached to the tank 114 and which extends thereinto. The housing member 122 includes a shoulder 124 against which a rupturable plate 126 abuts. The plate 126 has a circular groove 127 therein which provides a weakened portion which will rupture at a predetermined pressure. A stem-like projection 128 extends from the rupturable plate member 126 through the end of housing 122 which has a bore 130 therein to provide a guide surface therefor.

Immediately above the rupturable plate member 126 is a nozzle member 132 above which is a perforated plate 134. A suitable propellant 136 as described in connection with the embodiments of FIGS. 3–6 is positioned above the perforated plate member 134. The housing member 122 may also contain a primed pellet (not shown) and a squib or plurality of squibs (not shown) as described in connection with the previous embodiment.

The housing member 122 includes an internal chamber 138 below the rupturable plate 126. The chamber 138 communicates with the interior of the tank 114 by means of laterally extending openings 140. It is thought obvious that any number of such openings may be provided. The interior of the tank 114 along with chamber 138 provides a reservoir for storage of fluid, such as air, under pressure.

A cylindrical member 142 extends through the outlet 118 and is positioned in axial alignment with and diametrically across the tank from the housing member 122. The cylindrical member 142 may be attached to the tank 114 by welding or the like. The internal surface of member 142 is threaded to receive a threaded diffuser member 144. Mounted between the end 146 of the diffuser member 144 and an inturned flange 148 at the end of member 142 is a rupturable plate member 150. The plate member 150 has a circular groove 151 therein which provides a weakened portion which will rupture at a predetermined pressure. A series of apertures 152 are provided in the diffuser member 144 adjacent its closed end 154. The diffuser member extends into a manifold 156 which may be attached to cylindrical member 142 by any suitable means such as welding or the like. The open end of the manifold 156 is attached to the inflatable confinement 6 in any suitable manner.

The reservoir is filled with a fluid under pressure such as air or another inert gas through any suitable fill valve (not shown). In operation, the leads 160 and 162 of the squib mounted in the housing 122 are attached to a suitable sensing device such as described in connection with the previous embodiment. When the sensing device is actuated, an electrical current is passed to the squibs through the leads 160 and 162 to actuate them to ignite the propellant 136. The nozzle member 132 and perforated plate perform the same function as the similar members in the embodiment of FIGS. 3–6. As the propellant burns, it generates a hot gas which builds up to a predetermined pressure until the rupture plate 126 is ruptured. Upon rupturing, the rupture plate 126 and the stem 128 will move axially within chamber 138 toward the outlet 118. The length of the stem 128 and the distance from the end thereof to plate 150 is such that the end of the stem 128 will impact upon plate 150 and cause the rupture thereof before the broken-off portion of plate 126 is caught by the end of housing member 122 and retained therein. The broken-off portion of plate 150 will be contained in the diffuser member 144. The hot gas will flow into chamber 138 and be diverted laterally through aperture 140 by the end of the housing member 122 and the broken-off portion of plate 126 to mix with the pressurized fluid in the tank 114. The pressurized fluid in tank 114 along with the propellant gas will then exit through the openings 152 in the sidewall of the diffuser member 144 and inflate the confinement 6.

As in the embodiment of FIGS. 3–6, in the embodiment shown in FIG. 7, the hot gas generated by the propellant will be diverted into the main portion of the fluid reservoir and mix with the fluid before exiting. All the advantages set forth previously which arise because of this feature will be achieved in the embodiment of FIG. 7.

What is claimed is:

1. Apparatus for use in a vehicle safety system utilizing an inflatable confinement means, reservoir of pressurized fluid, and propellant charge for the generation of hot gas, said apparatus comprising:
    a. housing means having a chamber in open communication with the reservoir and having a fluid outlet adapted to be connected to said confinement;
    b. first means closing said fluid outlet against fluid flow;
    c. means connected to said housing for providing a propellant chamber to receive an ignitable, hot, gas-generating charge of propellant;
    d. mechanical means for sealing said housing means chamber from said propellant receiving chamber and operable upon development of a predetermined chamber pressure after ignition of said propellant to unseal said propellant receiving chamber and disable said first means from closing said outlet to permit said fluid and said hot gas to flow to the confinement;
    e. and means in said housing interposed between said propellant receiving chamber and said first means for deflecting at least a portion of hot gas into said reservoir upon flow of hot gas from said propellant chamber.

2. An apparatus for use in a safety system utilizing an inflatable confinement means, a stored fluid under pressure, and a propellant charge for the generation of a hot gas, said apparatus including:
    a. first means for storing fluid under pressure;
    b. a fluid outlet in said first means;
    c. second means closing said fluid outlet;
    d. third means connected to said first means and having a first chamber for storing a propellant charge and a second chamber, said third means and said fluid outlet being in alignment, said second chamber in said third means having communication with said means for storing fluid through at least one port extending in a direction transverse to the axis of the fluid outlet; and
    e. mechanical means for sealing said first chamber from said second chamber and operable upon development of a predetermined pressure in said first chamber after ignition of said propellant to unseal said first chamber and disable the second means to open said fluid outlet to permit the hot gas and fluid to flow to the confinement.

3. For use in a vehicle safety system utilizing an inflatable confinement means, a reservoir of pressurized fluid and a propellant charge for the generation of hot gas; the apparatus comprising:
    a. a housing having a chamber adapted to be placed in open communication with the reservoir;
    b. a fluid outlet in said housing;
    c. first rupturable means sealing said outlet against fluid flow;
    d. means connected to said housing for storing an ignitable, hot-gas generating charge of propellant;
    e. second rupturable means sealing said propellant charge from said chamber, said first rupturable means being in opposed relationship to said second rupturable means;
    f. means interposed between said first and second rupturable means so that upon ignition of said propellant said first rupturable means will rupture at a predetermined pressure and cause the rupture of said second rupturable member;
    g. and a baffle plate in said chamber interposed between said first and second rupturable means to deflect at least a portion of the hot gas into the reservoir upon flow from said propellant chamber prior to its exit through said fluid outlet.

4. The apparatus of claim 3 further including a nozzle member positioned adjacent said second rupturable means on the side opposite said chamber and having a single orifice therein and a plate having a plurality of perforations therein mounted between said nozzle member and the space for storing the propellant charge.

5. The apparatus of claim 3 wherein said means interposed between said first and second rupturable means extends through an aperture in said baffle plate and comprises a first member having one end positioned adjacent one of said rupturable means and its other end having a bore extending thereinto, and a second member having one end positioned adjacent the other of said rupturable members and its other end provided with an elongated reduced portion extending into said bore in said first member.

6. The apparatus of claim 5 wherein said one end of each of said first and second members is attached to its respective rupturable means.

7. The apparatus of claim 5 wherein said first member has a cylindrical body portion and said second member has a cylindrical body portion with the projection extending from the end thereof to a point short of the bottom of the bore in said first member, said body portion of each of said first and second members being spaced apart to permit relative movement toward each other before impact.

8. The apparatus of claim 5 wherein the member having its one end adjacent said second rupturable means has a flange at its one end larger than the aperture in said baffle plate, and further including a diffuser member communicating with said fluid outlet and including a plurality of apertures therein, said apertures being smaller than said member attached to said first rupturable means to prevent its escape therefrom while permitting the flow of gas and fluid therethrough.

9. The apparatus of claim 8 wherein said first rupturable means includes a rupturable portion larger than the aperture in said wall means and further including a diffuser member communicating with said fluid outlet and having a plurality of apertures therein, and said second rupturable means including a rupturable portion larger than any one of said apertures.

10. The apparatus of claim 5 wherein said chamber has a groove having a midplane perpendicular to the axis of said fluid outlet and said baffle plate is mounted in said groove.

11. An apparatus for use in a safety system utilizing inflatable confinement means, a stored fluid under pressure, and a propellant charge for the generation of a hot gas, said apparatus including:
    a. first means for storing fluid under pressure;
    b. a fluid outlet communicating with the interior of said first means;
    c. first rupturable means closing said fluid outlet;
    d. second means connected to said first means including a chamber for storing a propellant, and wall means defining a second chamber;
    e. second rupturable means closing the propellant chamber from said second chamber, said second rupturable means being oppositely disposed from said first rupturable means, said second chamber communicating with the interior of said first means by means of at least one port extending through said wall means transversely to the axis of said fluid outlet;
    f. an elongated rod member attached to said first rupturable means and extending through an aperture in said wall means toward said second rupturable means, the length of said rod member being greater than the distance between its end and the second rupturable means so that upon buildup of a predetermined pressure after ignition of the propellant, said first rupturable means will rupture and said rod member will be moved toward said second rupturable means to cause the rupture thereof permitting hot gas to flow through the port into the interior of said first means and mix with the stored fluid and the stored fluid and hot gas to pass through the fluid outlet.

12. An apparatus for use in a vehicle safety system utilizing an inflatable confinement means, a stored fluid under pressure, and a propellant charge for the generation of hot gas, said apparatus including:
   a. first means for storing fluid under pressure, and having a fluid outlet adapted to be connected to said confinement;
   b. second means closing said fluid outlet against fluid flow;
   c. third means connected to said first means for providing a chamber to receive an ignitable hot gas generating charge of propellant;
   d. means sealing said chamber from said first means and operable upon development of a predetermined chamber pressure after ignition of said propellant to unseal said chamber and cause a mechanical impact on said second means to disable the latter to permit stored fluid and hot gas from the burning of the propellant to flow through said fluid outlet;
   e. and means interposed between said chamber and said second means for deflecting at least a portion of the hot gas upon exit from said chamber in a direction away from said fluid outlet to mix with the fluid prior to exit.

13. An apparatus for use in a vehicle safety system utilizing an inflatable confinement means, a stored fluid under pressure, and a propellant charge for the generation of hot gas, said apparatus including:
   a. first means for storing fluid under pressure, and having a fluid outlet adapted to be connected to said confinement;
   b. second means closing said fluid outlet against fluid flow;
   c. third means connected to said first means for providing a chamber to receive an ignitable hot gas generating charge of propellant;
   d. fourth means in alignment with said second means and sealing said chamber from said first means and operable upon development of a predetermined chamber pressure after ignition of said propellant to unseal said chamber;
   e. and rod means in alignment with said second and fourth means for disabling said second means upon the unsealing of said chamber to permit the stored fluid and hot gas to flow through said outlet.

14. The apparatus of claim 13 wherein said rod means includes means for causing an impact to be applied to said second means upon the unsealing of said chamber to disable said second means.

15. The apparatus of claim 13 wherein said rod means includes a first portion attached to said fourth means and extending toward said second means and a second portion attached to said second means and extending toward said fourth means, one of said portions including a body and a reduced extension portion, and the other including a body portion having a bore in its end into which the reduced end portion is received, said body portions being spaced from each other.

16. The apparatus of claim 13 wherein said rod means have one end attached to said fourth means and extends toward said second means with its end spaced therefrom.

* * * * *